United States Patent [19]

Shibata

[11] Patent Number: 5,745,245
[45] Date of Patent: Apr. 28, 1998

[54] COMMUNICATION APPARATUS

[75] Inventor: Koichi Shibata, Osaka, Japan

[73] Assignee: Mita Industrial Co., Ltd., Osaka, Japan

[21] Appl. No.: 581,340

[22] Filed: Dec. 29, 1995

[30] Foreign Application Priority Data

Jan. 6, 1995 [JP] Japan ..................... 7-000636
Jan. 6, 1995 [JP] Japan ..................... 7-000637

[51] Int. Cl.$^6$ ................ H04N 1/417; H04N 1/41; H04N 1/415
[52] U.S. Cl. ................... 358/262.1; 358/261.1; 358/426; 358/433; 358/427; 382/238; 382/239
[58] Field of Search .................. 358/262.1, 261.4, 358/261.3, 262.2, 426, 427, 433, 442, 440, 432, 429, 430, 444; 382/238, 239, 243, 194, 209, 221, 232

[56] References Cited

U.S. PATENT DOCUMENTS

| | | | |
|---|---|---|---|
| 4,117,517 | 9/1978 | Shintani et al. | 358/261 |
| 4,511,213 | 4/1985 | Yamazaki et al. | 358/261 |
| 4,764,975 | 8/1988 | Inoue | 382/47 |
| 4,794,461 | 12/1988 | Roberts et al. | 358/261.3 |
| 4,837,848 | 6/1989 | Henderson et al. | 358/260 |
| 4,916,544 | 4/1990 | Lienard et al. | 358/262.1 |
| 5,130,809 | 7/1992 | Takayanagi | 358/430 |
| 5,293,251 | 3/1994 | Corcoran | 358/426 |
| 5,297,220 | 3/1994 | Nomizu | 358/430 |
| 5,491,564 | 2/1996 | Hongu | 358/429 |
| 5,521,717 | 5/1996 | Maeda | 358/426 |

*Primary Examiner*—Edward L. Coles, Sr.
*Assistant Examiner*—Mark Wallerson
*Attorney, Agent, or Firm*—Beveridge, DeGrandi, Weilacher & Young, LLP

[57] ABSTRACT

The facsimile machine codes image data in order to reduce the data size to be transmitted. In coding an image data, an adaptive template pixel is referred to whose position relative to the pixels to be coded is kept constant. In a sampling period, the relative position of the adaptive template pixel is changed for each image data among predetermined positions, and a compression rate is calculated and stored. When an image data is transmitted after the sampling period, the adaptive template pixel is set at one of the positions which yielded high compression rates in the sampling period.

8 Claims, 10 Drawing Sheets

COMMUNICATION APPARATUS

BACKGROUND OF THE INVENTION

1. Field of the Invention

The present invention relates to a communication apparatus such as a facsimile machine, and an electrographic copying machine and an image scanner having a data transmission function, and more specifically, to coding of image data to be transmitted.

2. Description of the Prior Art

Facsimile machines which are presently widespread transmit binarized image data (e.g. 0/1 and low level/high level). Likewise, electrographic copying machines handle binarized image data, and recently, binarized image data are stored in a memory such as a magnetic disk so that they can be read out at need to reproduce the images. In recent years, image data have been diversified and higher image resolution, i.e. higher pixel density has been demanded, so that the amount of data to be transmitted or stored is inevitably great.

In order to effectively transmit image data, binarized image data are coded and compressed. As standard methods therefor, the modified Huffman (MH) method, the modified read (MR) method and the modified modified read (MMR) method are put to practical use. According to these coding methods, sequential build up is carried out in which binary data are coded in an order in which the image data are read out from an original through scanning of the original. The sequential build up is convenient for apparatuses such as facsimile machines in which the transmitting side scans an original from the left to the right and from the top to the bottom to transmit it and the receiving side codes it in the order of reception to reproduce the image on paper, since it is unnecessary for the receiving side to store the received data.

On the other hand, high resolution images are not always required but there are occasions when it is necessary to quickly transmit and reproduce the entire image even if the image is coarse. With the sequential build up, however, it is not easy to sufficiently deal with such a case. For this reason, a progressive build up has been attracting attention in which coarse image data are transmitted at first and additional data are added at need to gradually increase the resolution of the reproduced image. Additionally, there are increasing demands for high speed and high fidelity reproduction of half tone images.

Under such circumstances, the Joint Bi-level Image Coding Experts Group (JBIG) was established and examination has been made as to effective coding of binary data. The JBIG aims mainly at the coexistence of the progressive build up and the sequential build up, high data compression effect, information retention and high speed processing. For these purposes, JBIG employs a binary data coding base system shown in FIG. 9.

First, the image is reduced to form hierarchical images (images of different resolutions) for the progressive build up. Then, pixels whose values are inevitably determined from pixels whose values are already known i.e. pixels which does not require coding are detected. These pixels are detected in two steps, that is, a step to detect pixels whose values are determined irrespective of the image reduction method such as pixels forming a blank line and a step to detect pixels whose values depend on the image reduction method. The former is called typical prediction and the latter, decisive prediction. These predictions reduce the number of pixels to be coded. The pixels left to be coded are arithmetically coded with reference to groups of pixels called templates. For the arithmetic coding, a method called QM coder is employed.

The templates referred to in coding the pixel to be coded include a model template and an adaptive template (AT). The model template is a group of pixels which have already been coded and located in the vicinity of the pixel to be coded. The number of pixels constituting the model template and the position of the model template relative to the pixel to be coded are fixed. For example, for an image of the lowest resolution layer in the progressive build up, a two-line template constituted by nine pixels shown at M in FIG. 10 and a three-line template constituted by nine pixels shown at M in FIG. 11 are used. In both figures, C represents the pixel to be coded. For images of higher resolution layers, other model templates constituted by a different number of pixels are prepared. In the sequential build up, there is only one layer and the model templates of FIGS. 10 and 11 are used.

On the other hand, the position of the adaptive template pixel relative to the pixel to be coded is not fixed but can be set according to each image. The default position of the adaptive template in the image of the lowest resolution layer is shown at A in FIGS. 10 and 11. The adaptive template is intended to improve the coding efficiency for images having pixels periodically correlated with one another. The adaptive template is selected in view of the correlation among the pixels. The adaptive template improves the coding efficiency, particularly, for images having pixels strongly correlated with one another in a predetermined period, such as dither images obtained by binarizing half tone images through comparison with a predetermined threshold value.

In FIGS. 10 and 11, x and y are axes of coordinates when the origin is set at the pixel C which is to be coded. The arrow of the x axis is the forward direction of the main scanning direction and the arrow of the y axis is the rearward direction of the sub scanning direction. As the coding progresses, the pixel to be coded is successively shifted by one pixel and the pixel positions of the model template and the adaptive template are successively shifted by one pixel accordingly, so that the positions of the templates relative to the pixel to be coded is maintained fixed except for the peripheral region of the image. With respect to the pixels to be coded existing in the peripheral region of the image, the relative positions of the model template and the adaptive template cannot be maintained fixed. However, exceptional rules are provided therefor.

The selection of the model template and the decision of the adaptive template position relative to the pixel to be coded are made by the transmitting side according to the image to be transmitted. The selected model template and the decided adaptive template position are recorded on the header together with other information used for the coding, and transmitted prior to the transmission of the image data. On the receiving side, the received coded data are decoded based on the information recorded on the header. Consequently, the image data read out from an original through scanning of the original on the transmitting side are positively reproduced on the receiving side.

While the compression rate of image data is expressed in various manners, it is typically expressed in an expression (1) shown below. The expression (1) represents the size of the coded image data relative to the size of the image data which has not been coded yet (hereinafter, referred to as "pre-coding image data"). The smaller the numeric value is, the higher the compression rate is.

$$\text{Compression rate} = \frac{\text{Total number of bits of coded data}}{\text{Total number of bits of pre-coding binarized data}} \quad (1)$$

When the No. 1 original image of the International Telegraph and Telephone Consultative Committee (CCITT) is coded, the compression rates obtained according to the MH, MR, MMR and JBIG methods are 0.14, 0.13, 0.035 and 0.028, respectively. The image data of the No. 1 original image includes characters, tables and graphs and is excellently compressed by any method. However, with respect to the former three conventional methods which are not intended for half tone image data, it is known that the compression effect is so low for such image data that the compression rate is 1 or higher to rather increase the amount of data. On the contrary, the JBIG method is expected to provide an excellent compression of a compression rate of approximately 0.1 for half tone image data.

As described above, the adaptive template is referred to in order to effectively code and compress images having pixels periodically correlated with one another. The JBIG defines a range of presence of the adaptive template pixel but does not define any methods for deciding the position of the adaptive template pixel. Moreover, no prior arts are found which show methods for deciding the position of the adaptive template pixel.

As the adaptive template, in view of its purpose, it is important to use a pixel having a high correlation with the pixel to be coded. If a pixel having a low correlation with the pixel to be coded is used as the adaptive template, the efficiency of the coding will deteriorate to lower the compression rate. On the other hand, if it takes a long time to decide the position of the adaptive template, the total efficiency of the image data transmission may deteriorate even though the coding efficiency improves.

SUMMARY OF THE INVENTION

An object of the present invention is to provide a communication apparatus which effectively codes image data by deciding the position of a reference pixel such as an adaptive template pixel based on a compression rate of coding in actual transmission.

To achieve the above-mentioned object, according to the present invention, a communication apparatus which codes image data including binarized pixels and transmits the coded image data is provided with the following: coding means for coding an image data by successively coding values of pixels of the image data, said coding means referring to a reference pixel located at a predetermined relative position to a pixel to be coded; pixel position storing means for storing a predetermined number of relative positions for the reference pixel; compression rate calculating means for calculating a compression rate of a coding by comparing sizes of the image data before and after coded by the coding means; storing means for storing the relative position of the reference pixel referred to by the coding means and the compression rate calculated by the compression rate calculating means; and controlling means operating in two modes.

In a first mode, the controlling means reads out one of the relative positions from the pixel position storing means in a predetermined order, causes the coding means to code an image data with the reference pixel at the relative position read out, transmits the image data coded by the coding means, causes the compression rate calculating means to calculate a compression rate of the coding, and stores the relative position and the compression rate in the storing means. In a second mode, the controlling means reads out a relative position corresponding to a high compression rate from among the relative positions stored in the storing means in the first mode, causes the coding means to code an image data with the reference pixel at the relative position, and transmits the image data coded by the coding means.

When the controlling means operates in the first mode, an image data is coded with the reference pixel being located at one of the positions stored in the pixel position storing means, and the coded image data is transmitted. The position of the reference pixel used in the coding and the compression rate of the coding are stored in the storing means. Another image data is treated likewise with the reference pixel located at another position. The positions of the reference pixel and the compression rates are accumulated in the storing means. When the controlling means operates in the second mode, a position corresponding to a high compression rate is read out of the storing means, and an image data is coded with the reference pixel being located at the position. The coded image data is transmitted. That is, the position of the reference pixel in the second mode is one which yielded a high compression rate in the first mode.

The number of positions of the reference pixel read out from the storing means for coding an image in the second mode may be only one or plural. When only one position is read out, it is a position corresponding to the highest compression rate in the first mode. When a plurality of positions are read out, a predetermined number of positions or the maximum number of positions that can be processed within a predetermined period of time are read out. In either case, coding of an image is performed for each position of the reference pixel and the image data which provides the highest compression rate is transmitted.

In a communication apparatus which codes image data according to the JBIG coding method, the above-described method is applied to the adaptive template pixel, which is a kind of the reference pixel, in the coding of image data.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
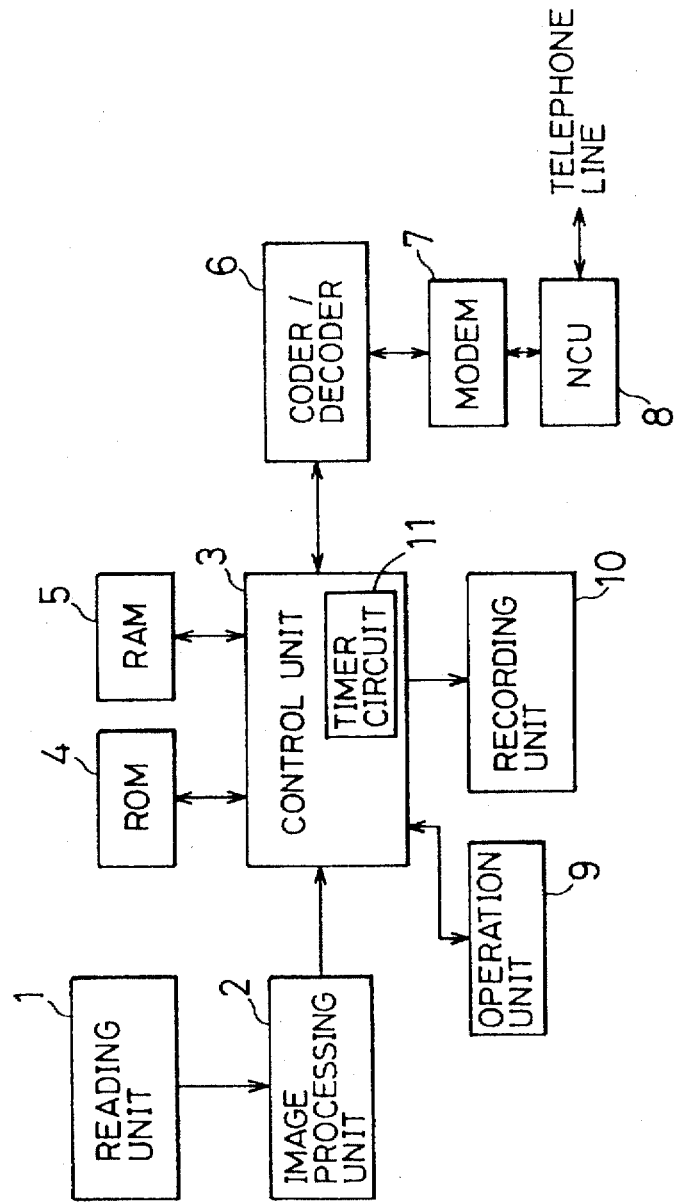
FIG. 1 is a block diagram showing the structure of a facsimile machine according to first, second and third embodiments of the present invention.

Referring to the block diagram of FIG. 1, there is shown a first embodiment in which the present invention is employed for a facsimile machine. The facsimile machine of the present embodiment includes a reading unit 1 which reads out an original image, an image processing unit 2 which processes an image data output of the reading unit 1, a control unit 3 which controls the entire facsimile machine, a read only memory (ROM) 4 which stores control programs and the like, a random access memory (RAM) 5 which temporarily stores image data and the like, a coder/decoder 6 which codes and decodes image data, a modem 7 which modulates and demodulates coded image data, a network control unit (NCU) 8 which connects the facsimile machine to the telephone line and transmits data, an operation unit 9 with which the user instructs the control unit 3, and a recording unit 10 which outputs image data to recording paper.

The reading unit 1 has a light source and a charge coupled device (CCD), and reads out an original image by irradiating light from the light source to the original image to detect the reflected light with the CCD. To read out the original image, the scanning of the original image in a lateral direction (main scanning) is repeated at a predetermined pitch in a longitudinal direction (sub scanning). The CCD outputs the detected light as an analog signal for each pixel.

The image processing unit 2 performs to an analog output from the CCD of the reading unit 1 shading processing such as correction attributed to non-uniformity in sensitivity of the CCD, and then, compares the output with a predetermined threshold value to binarize the image data for each pixel. The image processing unit 2 has two kinds of dither matrices. In binarizing half tone image data, these matrices are used to perform dither processing.

Figure 9:
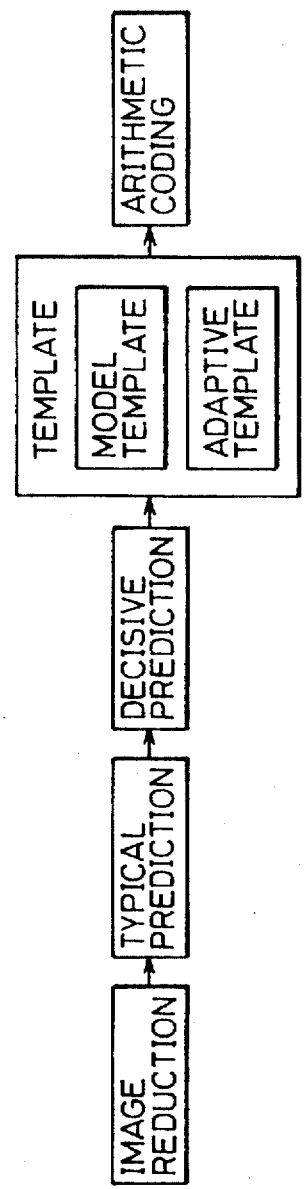
FIG. 9 is a block diagram showing an outline of a base system of the JBIG.

The ROM 4 stores not only the programs for controlling the facsimile machine but also programs for various JBIG processings shown in FIG. 9 and various tables such as the model template. The RAM 5 holds the image data binarized by the image processing unit 2 until transmission and temporarily stores results of various calculations performed by the control unit 3. The RAM 5 also holds the received image data. The coder/decoder 6 arithmetically codes the image data to be transmitted with the QM coder. For the received image data, the coded image data are decoded in reverse procedures to reproduce the image. The modem 7 and the NCU 8 transmit and receive image data by known standard methods.

The control unit 3 comprises a microcomputer which reads in the programs stored in the ROM 4 to control the entire facsimile machine. Moreover, the control unit 3 decides the position of the adaptive template referred to in coding. The control unit 3 is provided with a timer circuit 11 for a timer transmission to transmit image data at the time specified by the user. The timer transmission is used to transmit image data when it is convenient for the receiver or when the telephone line is not busy.

Figure 2:
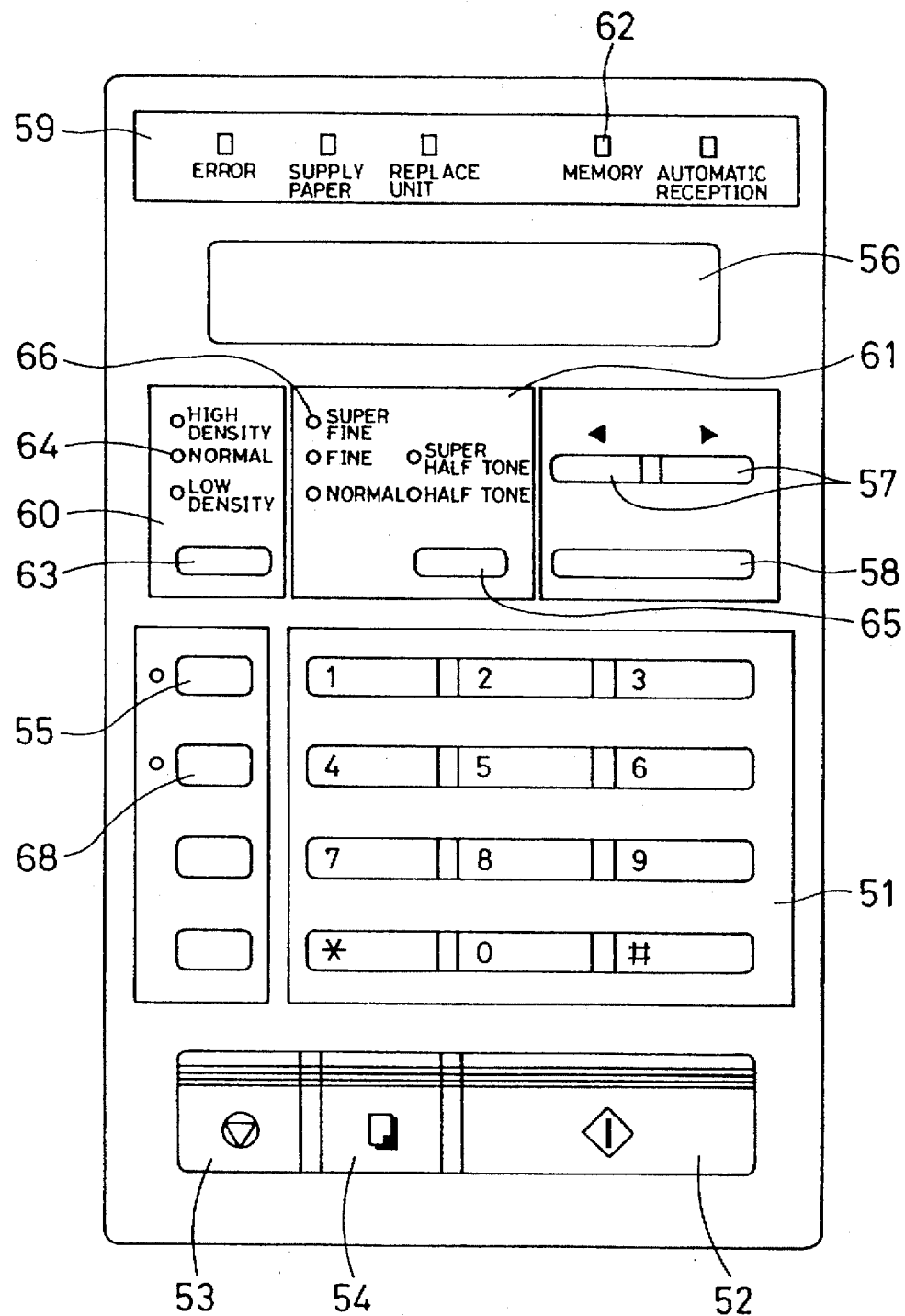
FIG. 2 shows the appearance of an operation unit of the facsimile machine according to the first, second and third embodiments.

Referring to FIG. 2, there is shown the appearance of a part of the operation unit 9. The operation unit 9 has various keys such as a ten key 51 for inputting numbers such as facsimile numbers, a start key 52 for instructing the start of reading of originals, a stop key 53 for instructing the stop of the operation, a memory print key 54 for instructing the recording unit 10 to start outputting received data stored in the RAM 5 and a timer key 55 for instructing the start of specification of the transmission time, and a display panel 56 comprising a liquid crystal display (LCD).

The receivers' facsimile numbers inputted by the ten key 51 are displayed on the display panel 56 so that they can be confirmed. When there is an error in the inputted number, the cursor on the display panel 56 is moved to the digit by a cursor key 57, and the number is re-inputted by the ten key 51 and set by an enter key 58. To perform the timer transmission, first, the timer key 55 is operated, and then, the transmission time is inputted by the ten key 51. The inputted transmission time is displayed on the display panel 56 and can be changed by operating the cursor key 57 and the enter key 58 like the facsimile number. The display panel 56 also displays simple messages relating to the operation to aid the user's input operation.

The operation unit 9 is provided with a condition indicator 59 which indicates operation conditions, a density specifying portion 60 for specifying the image densities of originals, and an image quality specifying portion 61 for specifying the image qualities of original images. The condition indicator 59 has light emitting diodes (LEDs) so that when there is an abnormality in the machine or a misoperation by the user, when the recording paper in the recording unit 10 is used up, when the received image data are stored in the RAM 5 and when the facsimile machine is in the automatic reception mode, the LEDs respectively corresponding to Error, Supply paper, Memory and Automatic reception are turned on to notify the user of the condition. When an LED 62 corresponding to Memory is on, by operating the memory print key 54, the image data stored in the RAM 5 are outputted from the recording unit 10 to recording paper.

The density specifying portion 60 has a density specifying key 63 and three LEDs 64. Every time the density specifying key 63 is operated, the setting is changed and one LED corresponding to the setting is turned on. According to the original image, the user specifies the density in three ranks of densities which are high, normal and low. In binarizing the output of the reading unit 1, the image processing unit 2 sets a threshold value corresponding to the density specified by the density specifying key 63. With this arrangement, the image data are appropriately binarized even if image density is different for each original.

The image quality specifying portion 61 has an image specifying key 65 and five LEDs 66. Every time the image quality specifying key 65 is operated, the setting is changed and one LED corresponding to the setting is turned on. The user makes a selection according to the image quality of the original. Specifically, when the original image is characters, Normal, Fine or Super fine is specified. Thereby, the pixel density of the highest resolution layer is determined. When the original image is of half tone, Half tone or Super half tone is specified. The image processing unit 2 having the two kinds of dither matrices selects a matrix according to the specification and performs dither processing to binarize the output of the reading unit 1.

The recording unit 10 employs a method in which an electrostatic latent image is formed on the surface of a photoreceptor drum and after toner is attached to the latent image to develop it, the developed image is transferred to recording paper.

In the facsimile machine having the above-described structure, the image data read out by the reading unit 1 and binarized by the image processing unit 2 are all stored in the RAM 5 at first. The image data stored in the RAM 5 are read out by the control unit 3 to decide the position of the adaptive template referred to in coding. The method for deciding the position of the adaptive template will be described later in detail. According to the progressive build up, the image data stored in the RAM 5 are read out by the control unit 3 for image reduction and the data of the reduced image are stored in the RAM 5.

In transmission, information used for coding such as the decided adaptive template position and the selected model template is recorded on the header, and modulated by the modem 7 and transmitted through the NCU 8. Then, the image data stored in the RAM 5 are successively read out and coded by the coder/decoder 6 with reference to the model template and the adaptive template. The coded image data are modulated by the modem 7 and outputted through the NCU 8 to the telephone line to be received by the receiver.

The data received through the NCU 8 are demodulated by the modem 7 at first. A header has been added at the head of the received data, and the control unit 3 reads out from the header information used in coding such as the model template and the adaptive template. With reference to the information, the coder/decoder 6 successively decodes the demodulated image data. Thereby, the binary image data of a condition before it is coded by the facsimile machine on the transmitting side are reproduced. According to the sequential build up, the binarized image data are immediately outputted to recording paper by the recording unit 10. According to the progressive build up, the data are stored in the RAM 5 at first and then outputted to recording paper by the recording unit 10 when the memory print key 54 of the operation unit 9 is operated or when the image of the highest resolution is reproduced.

In order to increase the coding efficiency, it is important to refer to pixels strongly correlated with the pixel to be coded. The facsimile machine of the present embodiment has a sampling mode in which the compression rate is calculated when the image data are actually coded and transmitted and the position of the adaptive template pixel relative to the pixel to be coded and the compression rate are stored. In the sampling mode, the position of the adaptive template pixel is selected from among a plurality of proposed positions to code an image data. After image data are transmitted in the sampling mode for a predetermined period of time, an adaptive template pixel position which provided the highest compression rate is selected from among the plurality of stored adaptive template pixel positions. Thereafter, the relative position of the adaptive template pixel to a pixel to be coded is set at the selected position, and image data are coded with reference to the adaptive template pixel.

Figure 10:
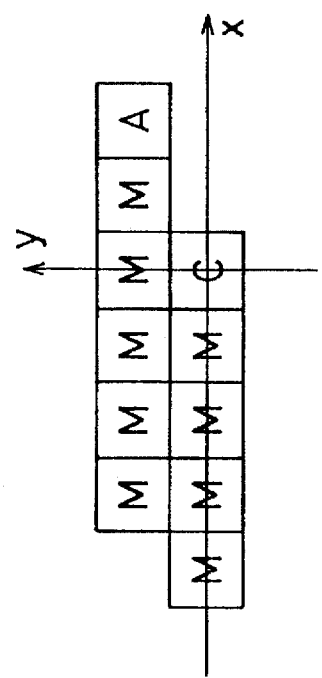
FIG. 10 shows a two-line model template and the default position of an adaptive template in an image of the lowest resolution layer.
Figure 11:
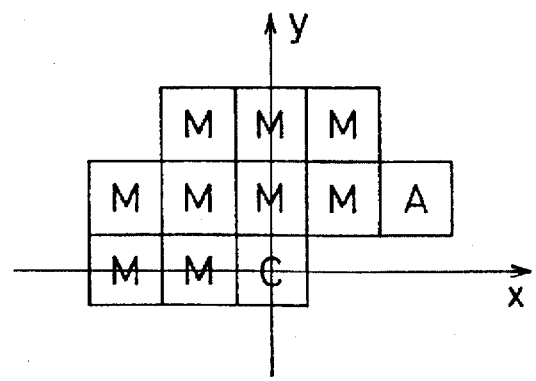
FIG. 11 shows a three-line model template and the default position of an adaptive template in an image of the lowest resolution layer.
Figure 12:
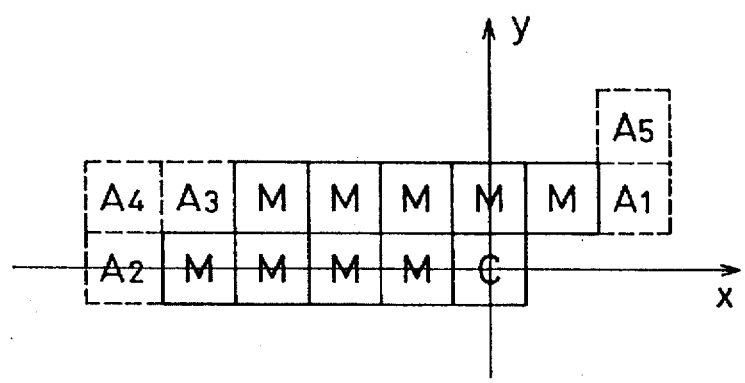
FIG. 12 shows proposed positions for the adaptive template in the first embodiment.

Specifically, a case will be described in which the two-line model template shown in FIG. 10 is used. First, five positions A1 to A5 shown in FIG. 12 are set as the proposed positions for the adaptive template pixel. These proposed positions are held in the ROM 4. In the sampling mode, the position of the adaptive template pixel is successively changed from A1 to A5 every time an original image is transmitted. For each transmission, the compression rate is calculated according to the expression (1) and the position of the adaptive template pixel and the compression rate are stored in the RAM 5. In the sixth transmission in the sampling mode, the position of the adaptive template pixel is again set to A1. Coding and transmitting an image data is carried out 100 times, in which the position of the adaptive template pixel is changed as described above. Then, the sampling mode is finished.

Examples of data stored in the RAM 5 in the sampling mode are shown in Table 1, where n represents an nth transmission, Cn represents a compression rate for coding in the nth transmission, and ax and ay are, as shown in FIG. 12, positions in the x and y axes of the adaptive template pixel relative to the pixel C to be coded.

After the end of the sampling mode, of the 100 transmission results, the position which provides the compression rate of the minimum value, i.e. the highest compression rate is set as the adaptive template pixel position. For example, when the highest compression rate is obtained in the coding of the eighth transmission in Table 1, the adaptive template pixel is set at the position where ax is −4 and ay is 1.

Figure 3:
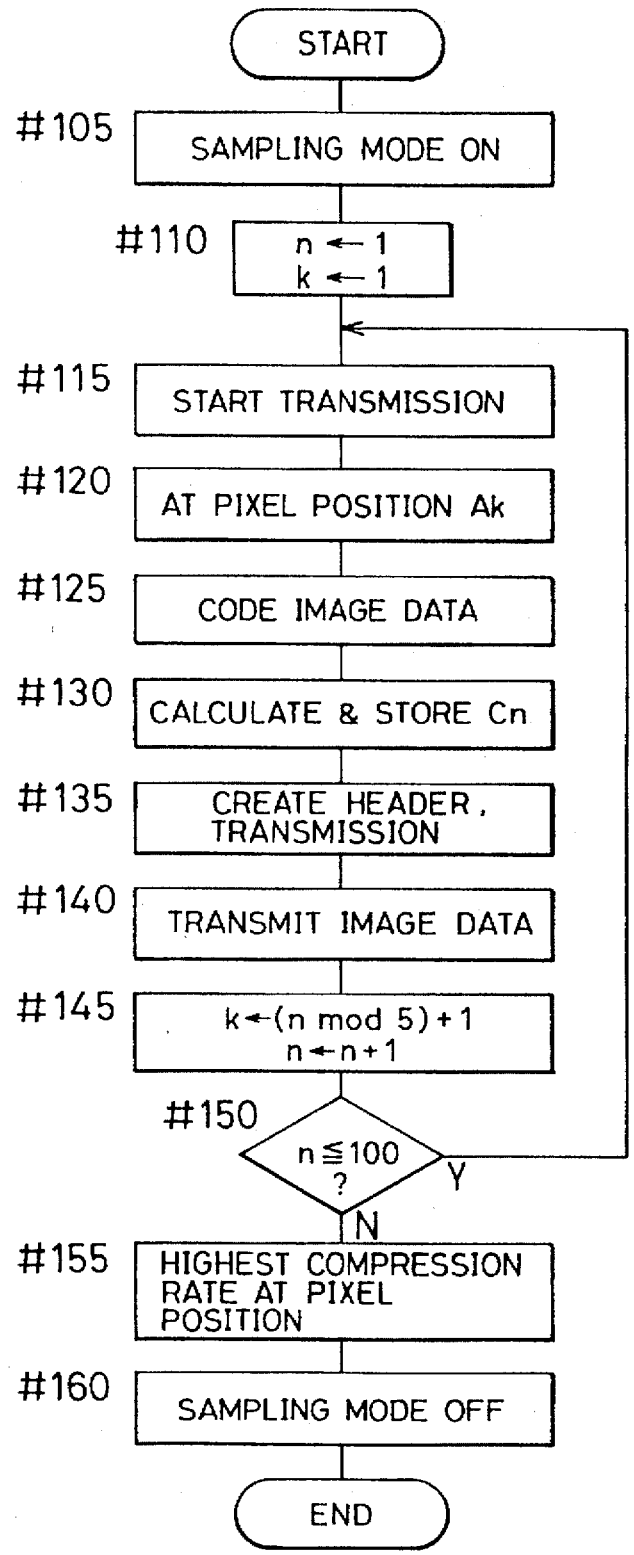
FIG. 3 is a flowchart of a processing performed in a sampling mode in the first embodiment.

Referring to FIG. 3, there is shown a flowchart of a processing performed in the sampling mode. At step #105, the facsimile machine is placed in the sampling mode by an operation of a mode key 68 (FIG. 2) by the user. At step #110, the number n of transmissions in the sampling mode is set to the initial value 1 and the number k of proposed adaptive template pixel positions is set to 1.

At step #115, an original transmission operation by the user is detected, and the following operations are performed: the reading of the original image by the reading unit 1, the image data processing and binarization of the pixel value by the image processing unit 2, and the storage of the image data in the RAM 5. At step #120, the value ax in the x direction and the value ay in the y direction corresponding to the kth proposed adaptive template pixel position Ak are read out from the ROM 4. At step #125, the image data is read out from the RAM 5, the adaptive template pixel is located at a position ax and ay away from the pixel to be coded in the x and y directions, and the image data is coded. At step #130, the compression rate Cn of the coding is calculated according to the expression (1) and stored in the RAM 5 together with ax and ay.

At step #135, a header including information such as the model template and the adaptive template is created and transmitted. Then, at step #140, the coded image data is transmitted.

At step #145, for setting the proposed positions for the next operation, a value obtained by adding 1 to the remainder of the division of n by 5 (total number of proposed pixel positions) is set as k. Then, 1 is added to n, and at step #150, n is compared with 100 (the number of transmissions in the sampling mode). When n is 100 or smaller, the process returns to step #115 to perform the next transmission. By the repetition, compression rates C1 to C100 are obtained while repeating the successive change of the adaptive template pixel from A1 to A5.

When it is judged at step #150 that n is greater than 100, the process proceeds to step #155 to search the 100 data groups stored in the RAM 5 for a group which provides the highest compression rate, i.e. which provides the compression rate of the minimum value, and ax, ay and the compression rate are stored in another area of the RAM 5. With this, the processing in the sampling mode is all finished and the facsimile machine is placed out of the sampling mode at step #160.

The image data coding efficiency varies according to the type of the original to be transmitted, and even if originals of the same type are transmitted, the efficiency varies according to the position of the adaptive template pixel. However, it is highly probable that originals transmitted through the same facsimile machine are of the same type, since there is a tendency for each user to transmit originals of a fixed type; for example, one user mainly transmits original images consisting of characters, while another user mainly transmits original images such as photographs consisting of half tone image data.

In the facsimile machine of the present embodiment, since an adaptive template pixel position which provides a high compression rate is detected based on the original which is actually transmitted during the sampling period, after the end of the sampling period, an adaptive template pixel of a high compression rate suitable for the user is referred to. As a result, the image data transmission time is reduced after the end of the sampling period.

While the number of proposed adaptive template pixel positions is five in the above-described embodiment, the number of proposed positions is not limited thereto but may be set to an arbitrary number. Moreover, the number of transmissions in the sampling mode is not limited to 100 but may be set to an arbitrary number. The greater this number is, the more information is obtained based on a lot of transmitted image data, so that the coding efficiency in the transmission performed after the end of the sampling period improves. In this case, however, the sampling period increases in which the coding efficiency largely varies.

While the sampling mode is finished after a predetermined number of image data have been transmitted in the above-described embodiment, the sampling period may be set by time such as one week or ten days. For this case, the processing may be modified as in the following example. The predetermined time is stored in the ROM 4. The timer circuit 11 of the control unit 3 is started when the facsimile machine is placed in the sampling mode at step #105 of FIG. 3, and the count value of the timer circuit 11 is compared with the predetermined time stored in the ROM 4 at step #150 to judge the end of the sampling mode.

A facsimile machine according to a second embodiment of the present invention will be described. The facsimile machine of this embodiment has the same structure as that of the first embodiment shown in FIG. 1 and the same portions and elements will not be described to avoid duplication. In this embodiment, like the first embodiment, the facsimile machine operates in the sampling mode for a predetermined period of time, in which an adaptive template pixel position is selected from among a plurality of proposed positions to code and transmit image data, and a compression rate is calculated and stored for each coding result. From among the plurality of stored adaptive template pixel positions, a predetermined number of positions which provide high compression rates are selected. After the end of the sampling mode, coding of an image data is performed for each of the adaptive template pixel positions and the image data of the highest compression rate of all is transmitted.

Figure 13:
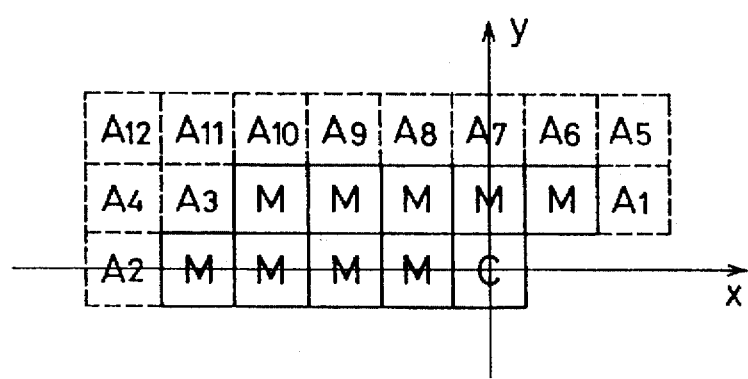
FIG. 13 shows proposed positions for the adaptive template in the second and third embodiments.

An example in which the two-line model template is used will be specifically described. Twelve proposed pixel positions A1 to A12 shown in FIG. 13 are stored in the ROM 4. In the sampling mode, every time an original image is transmitted, the position of the adaptive template pixel is successively changed from A1 to A12. Then, for each transmission, the compression rate is calculated according to the expression (1) and the adaptive template pixel position and the compression rate are stored in the RAM 5. In the thirteenth transmission in the sampling mode, the adaptive template pixel position is again set to A1. After the process in which the adaptive template pixel is changed to code an image data and the coded image data are transmitted is repeated 96 times, the sampling mode is finished. Table 2 shows an example of data stored in the RAM 5 in the sampling mode.

When the sampling mode is finished, five adaptive template pixel positions which provide high compression rates are selected from among the 96 transmission results and the selected positions are stored in the RAM 5. At this time, the same positions are not stored to avoid duplication. Table 3 shows the first to fifth highest results of Table 2.

In the transmission performed after the end of the sampling mode, the adaptive template pixel is set at these five positions to perform coding of an image data and the compression rate is obtained according to the expression (1) for each position. The coded image data which provides the highest compression rate is transmitted.

Figure 4:
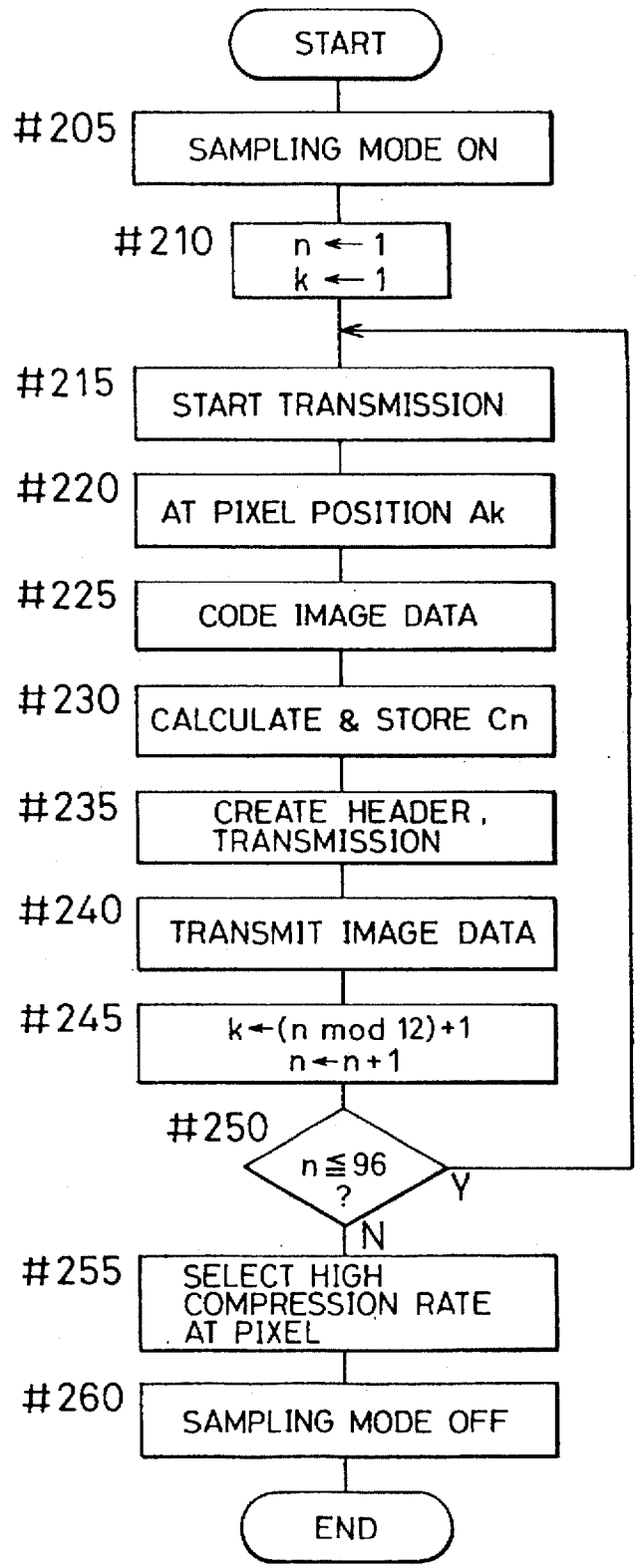
FIG. 4 is a flowchart of a processing performed in a sampling mode in the second embodiment.

Referring to FIG. 4, there is shown a flowchart of a process performed in the sampling mode. The process at steps #205 to #240 are the same as that of steps #105 to #140 of FIG. 3. At step #245, since the total number of proposed pixel positions is twelve, a value obtained by adding 1 to the remainder of the division of n by 12 is set as k and used for selecting the next proposed pixel position Ak. Then, 1 is added to n, and at step #250, n is compared with 96 which is the predetermined number of transmissions in the sampling mode. When n is 96 or smaller, the process returns to step #215 to perform the next transmission. By the repetition, the compression rates C1 to C96 are obtained while repeating the successive change of the adaptive template pixel from A1 to A12.

When it is judged at step #250 that n is greater than 96, the process proceeds to step #255 to select five data groups which provide high compression rates from among the 96 data groups stored in the RAM 5, and the ax and ay thereof and the compression rates are stored in another area of the RAM 5.

Figure 5:
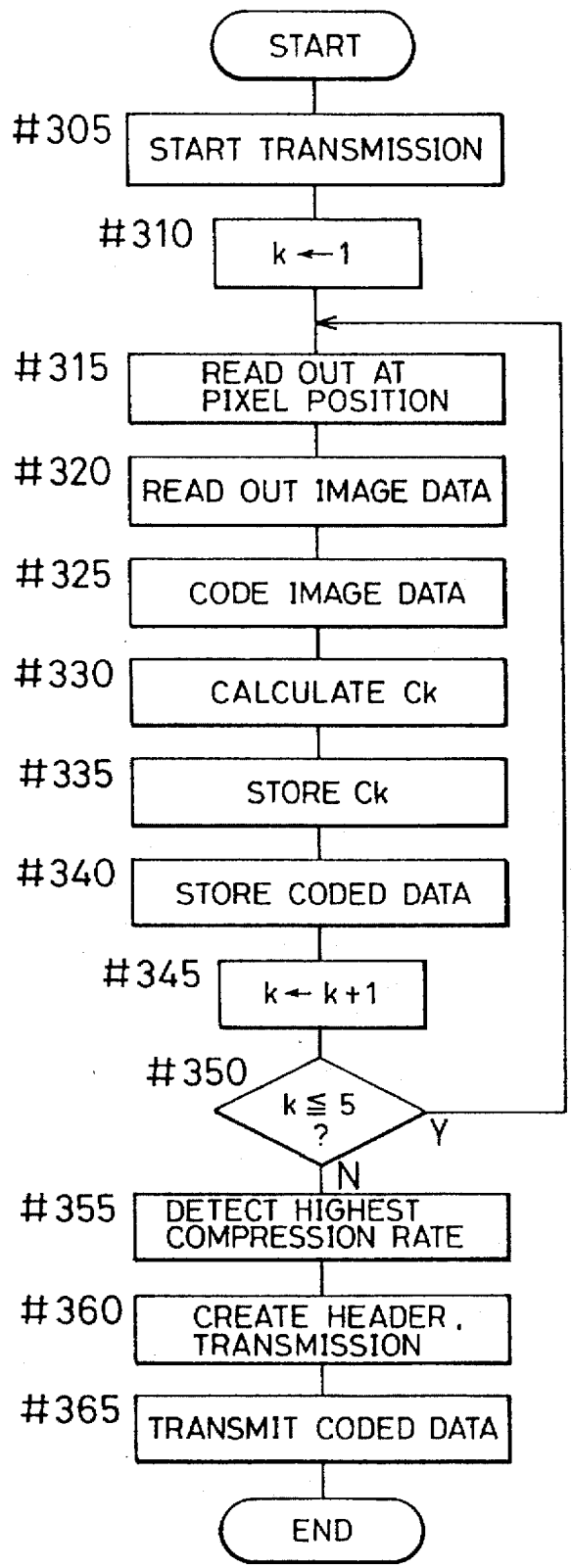
FIG. 5 is a flowchart of a processing performed after the end of the sampling mode in the second embodiment.

Referring to FIG. 5, there is shown a flowchart of the process performed after the end of the sampling mode. When the transmission is started at step #305, the original image is read out by the reading unit 1, the image data processing and the binarization of the pixel values are performed by the image processing unit 2, and the image data are stored in the RAM 5. At step #310, k is set to the initial value 1.

At step #315, the kth ax and ay of the five data groups stored in the RAM 5 are read out, and at step #320, the image data not coded yet is read out of the RAM 5. At step #325, the image data is coded with the adaptive template pixel being located at the position of the ax and ay read out at step #315. At step #330, the compression rate Ck is calculated according to the expression (1). At steps #335 and #340, the compression rate Ck and the coded image data are stored in the RAM 5, respectively. At step #345, 1 is added to k.

When it is judged at step #350 that k is 5 or smaller, the process returns to step #315 to repeat the above-described process. When k is greater than 5, the process proceeds to step #355 to find the highest compression rate, i.e. the compression rate of the minimum value out of the compression rates C1 to C5 stored in the RAM 5. At step #360, a header including information on the position of the adaptive template pixel which provided the highest compression rate is created and transmitted. Then, at step #365, the coded image data which corresponds to the highest compression rate is read out from the RAM 5 and transmitted.

According to the facsimile machine of the present invention, a predetermined number of adaptive template pixel positions which provide high compression rates are detected based on the original which is actually transmitted during the sampling period, so that the positions of the adaptive template pixels are suitable for coding originals of the type frequently transmitted by the user. Additionally, in the transmission performed after the end of the sampling period, each original image is actually coded based on each adaptive template pixel position and the image data of the highest compression rate thereof is transmitted, so that the time required for the transmission of image data is positively reduced.

The proposed positions of the adaptive template pixels and the number may be arbitrarily set as well as the number of transmissions performed in the sampling mode. The sampling period may be set by time. Further, the number of adaptive template pixels of high compression rates which are selected at the end of the sampling mode may be arbitrarily set. If this number is great, coding will be performed for a multitude of adaptive template pixel positions in the transmission performed after the end of the sampling mode, so that the improvement in compression rate is expected.

A facsimile machine according to a third embodiment of the present invention will be described. The structure of the machine is the same as that of FIG. 1. Like the second embodiment, the facsimile machine of this embodiment sets the adaptive template pixel successively at a plurality of proposed positions to transmit image data. However, this embodiment is intended to effectively use the waiting time in the timer transmission. In the transmission performed after the end of the sampling mode, an image data is coded with respect to as many positions as possible among the proposed positions which provide high compression rates in the sampling mode and the adaptive template pixel is set at the position which provides the highest compression rate.

The number of codings in the transmission performed after the end of the sampling mode is decided in the following manner: When the timer transmission is performed in which a transmission time is specified, the number of codings is set to the maximum number that can be performed within the time period from the reading out of the original to the start of the transmission. When not in the timer transmission, i.e. when transmission is performed successively to the reading out of the original, the number is set to a small value, e.g. three. In the timer transmission, the number is also set to three when the time period from the reading out of the original to the transmission is short and the maximum number of codings that can be performed is less than three.

Figure 6:
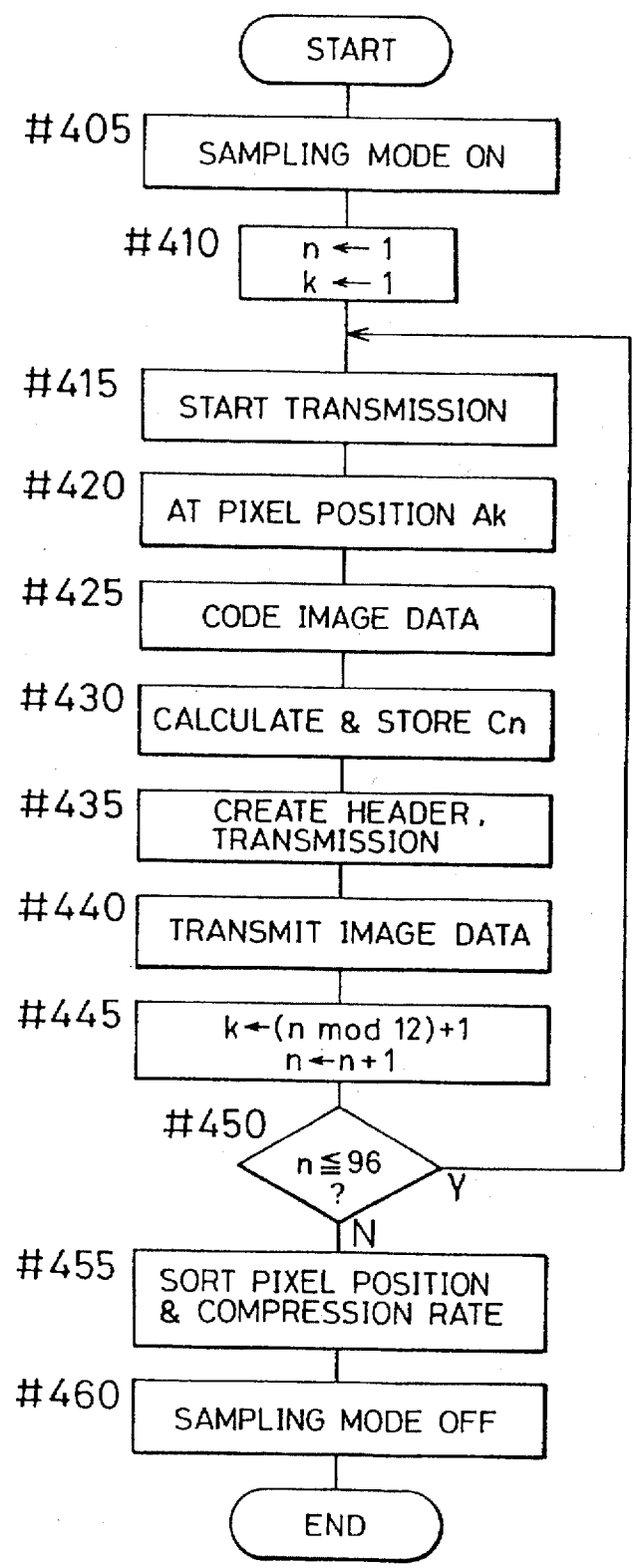
FIG. 6 is a flowchart of a processing performed in a sampling mode in the third embodiment.

Referring to FIG. 6, there is shown a flowchart of the process performed in the sampling mode. In this process, like the second embodiment, the twelve proposed adaptive template pixel positions A1 to A12 shown in FIG. 13 are set and the transmission is performed 96 times. The process in the sampling mode is substantially the same as that of the second embodiment. Steps #405 to #450 of FIG. 6 will not be described since they are completely the same as steps #205 to #250 of FIG. 4. After the transmissions are all finished, at step #455, the 96 pairs of adaptive template pixel positions and compression rates are sorted into the order from the highest to the lowest compression rates, i.e. into the order from the minimum to the maximum values and the sorted data are stored in another area of the RAM 5.

Table 4 shows an example of the sorted order in a case where the results of the coding in the sampling mode are the same as those shown in Table 2.

In the image data transmission performed after the end of the sampling mode, the sorted adaptive template pixel positions are read out successively beginning with the best one to code the image data. At this time, adaptive template pixel positions which are the same as any of the positions that have already been referred to is omitted to avoid duplication. For example, the ax and ay of the third and fourth adaptive template pixels are the same in Table 4, so that coding referring to the fourth adaptive template pixel is not performed. For each coding result, the compression rate is calculated according to the expression (1). The coding and the calculation of the compression rate are repeated predetermined times. The coded image data which provides the highest compression rate of all is transmitted.

Figure 7:
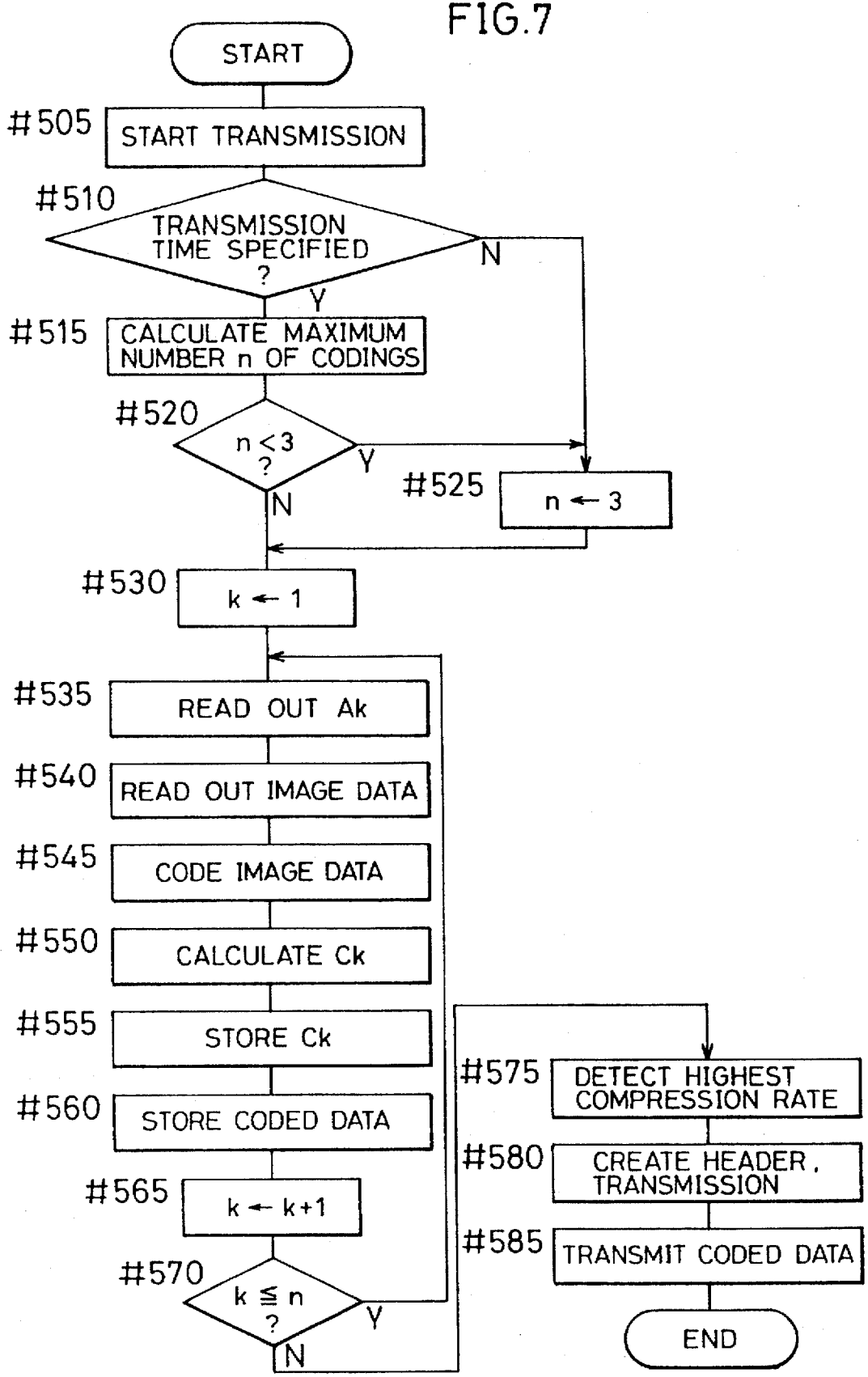
FIG. 7 is a flowchart of a processing performed after the end of the sampling mode in the third embodiment.

Referring to FIG. 7, there is shown a flowchart of the image data transmission process performed after the end of the sampling mode. At step #505, the original transmission operation by the user is detected, the original image is read out by the reading unit 1, the image data processing and the binarization of the pixel values are performed by the image processing unit 2, and the image data is stored in the RAM 5. In transmitting an original, the user can perform the timer transmission by specifying a transmission time by operating the timer key 55 as described previously. In the case of the timer transmission, the timer circuit 11 of the control unit 3 is started. At step #510, whether a transmission time has been specified or not is judged. When no transmission time has been specified, the process proceeds to step #525.

When a transmission time is specified at step #505, at step #515, the time period from that time to the specified transmission time is divided by the time required for a single coding to calculate the maximum number of codings that can be performed. That is, the quotient of the division is set as the number N of trial codings. The time required for a single coding is substantially in proportion to the size of the image data, and the time per unit size experientially obtained is stored in the ROM 4. The time for the coding of the image data is calculated based on the stored value.

At step #520, the number N of trial codings is compared with three. When it is equal to or greater than three, the process proceeds to step #530. When it is judged at step #520 that the number N of trial codings is smaller than three and when it is judged at step #510 that a transmission time is not specified, the number of trial codings is set to three at step #525. At step #530, the number k of codings is set to the initial value 1.

At step #535, the adaptive template pixel position ax and ay of the kth highest compression rate among the 96 data groups sorted at the end of the sampling mode is read out from the RAM 5. Then, at step #540, the image data stored in the RAM 5 is read out, and at step #545, the image data is coded with reference to the adaptive template pixel located at the above-mentioned position. At step #550, the compression rate Ck is calculated according to the expression (1) and the result is stored in the RAM 5 at step #555. At step #560, the coded image data is stored in the RAM 5.

At step #565, 1 is added to k. At step #570, k is compared with the number N of trial codings. When k is equal to or smaller than N, the process returns to step #535 to perform the coding and the calculation of the compression rate with reference to the next adaptive template pixel position. When k is greater than N, since coding has been performed N times, the process proceeds to step #575.

At step #575, the compression rates in the N codings are read out from the RAM 5 to detect the highest compression rate. At step #580, a header which includes information on the position of the adaptive template pixel corresponding to the highest compression rate is created and transmitted. Then, at step #585, the coded image data corresponding to the highest compression rate is read out from the RAM 5 and transmitted.

In the timer transmission, when the specified transmission time has not come yet at step #580, the process waits until the transmission time to start the transmission. The waiting time is shorter than the time required for a single coding. The transmission start time is notified by an output of the timer circuit 11.

As mentioned previously, it is highly probable that originals transmitted through the same facsimile machine are of the same type. In the facsimile machine of the present embodiment, an adaptive template pixel position which provides a high compression rate is detected based on the originals which are actually transmitted during the sampling period, so that after the end of the sampling period, an adaptive template pixel of a high compression rate suitable for the user is referred to. In addition, each original image is actually coded based on each adaptive template pixel position and the image data of the highest compression rate thereof is transmitted, so that the compression rate positively increases. As a result, the time required for the image data transmission is reduced.

In the timer transmission, the time period from the reading out of the original to the transmission is effectively used and coding is performed for as many adaptive template pixel positions as possible, so that image data coded at a very high compression rate can be transmitted. In addition, when the time period from the reading out of the original to the specified transmission start time is long, transmission is positively started at the specified transmission start time.

When the time from the reading out of the original to the specified transmission start time is short, the start of the transmission may be behind the specified time since the adaptive template pixel is set at three positions and the image data is coded with reference to each of the positions. However, since the time required to perform coding three times is short compared to the length of the time of which the user is conscious in performing a timer transmission, the delay of start of the transmission can be regarded as insignificant. In addition, the transmission time is short since the image data of the highest compression rate of the three times of coding is transmitted and it is highly probable that the image data transmission is completed earlier than the case in which the image data is coded only for the adaptive template pixel position which provided the highest compression rate in the sampling mode and the coded image data is immediately transmitted.

The image data of the highest compression rate of the three times of coding is also transmitted when not in the timer transmission, so that it is highly probable that the image data transmission is completed earlier and the average image data transmission time is reduced. When the timer transmission is not performed, the function of the facsimile machine of this embodiment is substantially the same as the function of the facsimile machine of the second embodiment.

The proposed positions of the adaptive template pixel, their number, and the number of transmissions in the sampling mode may be set arbitrarily. While the sampling mode ends when the transmission is performed predetermined times in the above-described embodiment, the sampling period may be set by time. Further, while the number N of trial codings is set so as not to be less than three in the transmission performed after the end of the sampling mode, the minimum value may be set arbitrarily. However, the number N of trial codings is preferably two or more in order to ensure the improvement of the compression rate.

Figure 8:
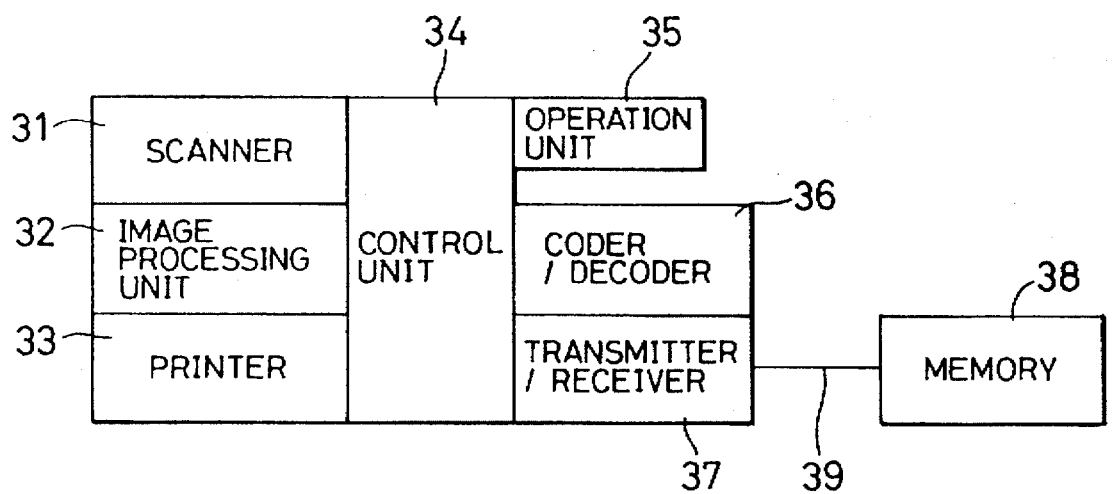
FIG. 8 is a block diagram showing the structure of an electrographic copying machine according to fourth and fifth embodiments of the present invention.

Referring to the block diagram of FIG. 8, there is shown an electrographic copying machine according to a fourth embodiment of the present invention. The electrographic copying machine is provided with a scanner 31, an image processor 32, a printer 33, a control unit 34, an operation unit 35, a coder/decoder 36, a transmitter/receiver 37 and a memory 38. The original image is read out by the scanner 31. The image data read out by the scanner 31 is processed for shading and the like and binarized by the image processing unit 32 and outputted to recording paper by the printer 33.

The control unit 34 controls the entire copying machine. The operation unit 35 has various keys such as a ten key. The user operates the operation unit 35 to supply the control unit 34 with instructions as to the paper size, the copy quantity, the image enlargement/reduction and the image density. The operation unit 35 has a display panel for echo-back-displaying messages on operations and inputs from the ten key to assist the user to operate the copying machine. The memory 38 is provided outside the copying machine and is connected to the transmitter/receiver 37 through a data line 39. As the memory medium of the memory 38, for example, a RAM, a magnetic disk or an optical disk is used.

The coder/decoder 36 codes the binarized image data according to the JBIG method. The transmitter/receiver 37 outputs the image data coded by the coder/decoder 36 to the data line 39 to transmit it to the memory 38. The memory 38 stores the received data. The transmitter/receiver 37 receives the stored data from the memory 38 through the data line 39. The received data is decoded by the coder/decoder 36.

In the coding of the image data by the coder/decoder 36, the model template and the adaptive template are referred to. The position of the adaptive template pixel is decided according to the method shown in the first or the second embodiment. Specifically, a period during which the copying machine operates in the sampling mode is provided to obtain the compression rates of an original image copied during this period and the positions of the adaptive templates and the compression rates are stored. After the end of the sampling mode, positions corresponding to high compression rates are selected from among the stored positions and employed as the positions of the adaptive template pixels. The selected model template and the decided adaptive template pixel position are recorded on the header so as to be stored in the memory 38 together with the image data and are referred to by the coder/decoder 36 when the image data is decoded.

In the copying machine of the above-described arrangement, the image data read out by the scanner 31 and processed by the image processing unit 32 can be outputted to recording paper by the printer 33 and can be stored in the memory 38 after being coded. The user operates a key of the operation unit 35 to select whether the image data is outputted to recording paper or stored in the memory 38. Further, the image data stored in the memory 38 can be read out at any time so as to be outputted to recording paper by the printer 33. This is done by operating a key of the operation unit 35.

By performing the coding with reference to the adaptive template whose position relative to the image data to be coded is decided according to the method described previously, the image data is coded at a high compression rate. Consequently, the time is reduced which is required for the transmission of image data between the transmitter/receiver 37 and the memory 38 and the amount of data to be transmitted is reduced to decrease the physical memory area occupied by the image data in the memory 38.

While the memory 38 is provided outside the copying machine in this embodiment, it may be provided inside the copying machine. The structure of the above-described copying machine excepting the printer 33 functions as an image scanner. Thus, the present invention can be employed for an image scanner.

An electrographic copying machine according to a fifth embodiment of the present invention will be described. The structure of this copying machine is substantially the same as that of the copying machine of the fourth embodiment shown in FIG. 8. In this embodiment, the memory 38 is placed at a remote site from the copying machine and the telephone line is used as the data line 39 for connecting the transmitter/receiver 37 and the memory 38. The control unit 34 is provided with a timer circuit (not shown) so that the timer transmission can be performed. The ten key of the operation unit 35 is operated to specify a transmission time.

The coding of the image data by the coder/encoder 36 is performed according to the method shown in the third embodiment. Specifically, while the copying machine is operated in the sampling mode, the position of the adaptive template pixel is successively changed among predetermined proposed positions and the pixel positions and the compression rates are stored. The stored data are sorted into the order of the highest to the lowest compression rates at the end of the sampling mode, and in the timer transmission performed thereafter, coding is performed with respect to as many adaptive template pixel positions as possible. Then, the image data which provides the highest compression data is transmitted and stored in the memory 38. The model template and the adaptive template pixel position are recorded on the header of the image data for reference for decoding.

Generally, copying machines are preferably of small size. In the electrographic copying machine of the above-described structure, since the memory 38 is placed far away from the copying machine, the copying machine is maintained of small size while a very large capacity memory can be used as the memory 38, so that a large amount of image data can be stored for a long period of time. The storage of the image data to the memory 38 is made through the telephone line 39. The copying machine having the timer function is very effective since the image data can be transmitted when the telephone line is not busy, e.g. at night. The waiting time in the timer transmission is utilized for improving the compression rate of the image data, and the memory areas of the memory 38 can be used efficiently.

Obviously, many modifications and variations of the present invention are possible in light of the above teachings. It is therefore to be understood that within the scope of the appended claims, the invention may be practiced other than as specifically described.

TABLE 1

| n | ax | ay | Cn |
|---|---|---|---|
| 1 | 2 | 1 | 0.08 |
| 2 | −5 | 0 | 0.36 |
| 3 | −4 | 1 | 0.12 |
| 4 | −5 | 1 | 0.15 |
| 5 | 2 | 2 | 0.20 |
| 6 | 2 | 1 | 0.17 |
| 7 | −5 | 0 | 0.41 |
| 8 | −4 | 1 | 0.05 |
| ... | | | |
| 100 | 2 | 2 | 0.28 |

TABLE 2

| n | ax | ay | Cn |
|---|---|---|---|
| 1 | 2 | 1 | 0.08 |
| 2 | −5 | 0 | 0.36 |
| 3 | −4 | 1 | 0.12 |
| 4 | −5 | 1 | 0.15 |
| 5 | 2 | 2 | 0.20 |
| 6 | 1 | 2 | 0.02 |
| 7 | 0 | 2 | 0.12 |
| 8 | −1 | 2 | 0.27 |
| 9 | −2 | 2 | 0.03 |
| 10 | −3 | 2 | 0.07 |
| 11 | −4 | 2 | 0.48 |
| 12 | −5 | 2 | 0.06 |
| 13 | 2 | 1 | 0.14 |
| 14 | −5 | 0 | 0.39 |
| ... | | | |
| 96 | −5 | 2 | 0.04 |

TABLE 3

| Order | ax | ay | Cn |
|---|---|---|---|
| 1 | 1 | 2 | 0.02 |
| 2 | −2 | 2 | 0.03 |
| 3 | −5 | 2 | 0.04 |
| 4 | −3 | 2 | 0.07 |
| 5 | 2 | 1 | 0.08 |

TABLE 4

| Order | ax | ay | Cn |
|---|---|---|---|
| 1 | 1 | 2 | 0.02 |
| 2 | −2 | 2 | 0.03 |
| 3 | −5 | 2 | 0.04 |

TABLE 4-continued

| Order | ax | ay | Cn |
|---|---|---|---|
| 4 | −5 | 2 | 0.06 |
| 5 | −3 | 2 | 0.07 |
| ... | | | |
| 96 | −4 | 2 | 0.48 |

What is claimed is:

1. A communication apparatus which codes image data including binarized pixels and transmits the coded image data, comprising:

coding means for coding an image data by successively coding values of pixels of the image data, said coding means referring to a reference pixel located at a predetermined relative position to a pixel to be coded;

pixel position storing means for storing a predetermined number of relative positions for the reference pixel;

compression rate calculating means for calculating a compression rate of a coding by comparing sizes of the image data before and after being coded by the coding means;

storing means for storing the relative position of the reference pixel referred to by the coding means and the compression rate calculated by the compression rate calculating means; and controlling means operating in a first mode in which said controlling means reads out one of the relative positions from the pixel position storing means in a predetermined order, causes the coding means to code an image data with the reference pixel at the relative position read out, transmits the image data coded by the coding means, causes the compression rate calculating means to calculate a compression rate of the coding, and stores the relative position and the compression rate in the storing means, and in a second mode in which said controlling means reads out a relative position corresponding to a high compression rate from among the relative positions stored in the storing means in the first mode, causes the coding means to code an image data with the reference pixel at the relative position, and transmits the image data coded by the coding means, and wherein the controlling means, when operating in the second mode, successively reads out relative positions corresponding to high compression rates from among the relative positions stored in the storing means, causes the coding means to code an image data with the reference pixel at each of the relative positions, and causes the compression rate calculating means to calculate a compression rate of each coding, and wherein said calculating means operates for a predetermined period of time such that the number of calculations performed by said calculating means within said predetermined period is variable for different image data, and transmits a coded image data corresponding to a highest compression rate among the image data coded during the predetermined period.

2. A communication apparatus according to claim 1, wherein said communication apparatus is a facsimile machine.

3. A communication apparatus according to claim 1, wherein said communication apparatus is a copying machine comprising:

original reading means;

image processing means for processing an image data read out by the original reading means and supplying the image data to the coding means; and transmitting means for transmitting the image data coded by the coding means to an image storing apparatus.

4. A communication apparatus according to claim 1, wherein said communication apparatus is an image scanner comprising:

original reading means;

image processing means for processing an image data read out by the original reading means and supplying the image data to the coding means; and transmitting means for transmitting the image data coded by the coding means to an image storing apparatus.

5. A communication apparatus which codes image data according to a Joint Bi-Level Image Coding Experts Group coding method, comprising:

inputting means for inputting a future time setting to delay a start in transmission of image data until that future time setting arrives;

coding means for coding an image data by referring to an adaptive template pixel;

proposed position storing means for storing a predetermined number of proposed positions for the adaptive template pixel;

compression rate calculating means for calculating a compression rate of a coding by comparing sizes of the image data before and after being coded by the coding means;

storing means for storing the position of the adaptive template pixel referred to by the coding means and the compression rate calculated by the compression rate calculating means; and controlling means for reading out one of the proposed positions from the proposed position storing means in a predetermined order, causing the coding means to code an image data with the adaptive template pixel at the position read out, transmitting the image data coded by the coding means, causing the compression rate calculating means to calculate a compression rate of the coding, and storing the position of the adaptive template pixel referred to and the compression rate calculated in the storing means; and said controlling means, when a future time setting for starting transmission of image data is input through the inputting means, initiates at starting time (A), which is before the set future time setting, a successive reading out of positions corresponding to high compression rates from among the positions stored in the storing means, causes the coding means to code the image data with the adaptive template pixel at each of the positions read out, and causes the compression rate calculating means to calculate a compression rate of each coding for a period of time extending from said starting time (A) to a time corresponding with said future time setting, and transmitting a coded image data corresponding to a highest compression rate among the image data coded during the period of time extending from said starting time (A) to the time corresponding with said future time setting.

6. A communication apparatus according to claim 1, wherein stored data in the storing means is sorted into an order of highest to lowest compression rates, and said controlling means, when operating in the second mode, causes the compression rate calculating means to calculate a compression rate for a maximum number of stored codings within said predetermined period of time beginning with a position corresponding to the highest compression rate sorted by said sorter and working toward the position corresponding to the lowest compression rate sorted by said sorter.

7. A communication apparatus according to claim 5, wherein said control means further causes a calculation of a maximum number of times in which compression rate calculations can be made before said future time setting arrives by dividing said period of time extending from starting time (A) to said future time setting by a known time value for a single coding stored in said memory means.

8. A communication apparatus as recited in claim 5, wherein the storing of compression rates and corresponding adaptive template pixel positions during a sampling period includes sorting the calculated compression rates, into an order of highest to lowest compression rates and the successive reading out of positions during the time period extending from said starting time A to the time corresponding with said future time setting is conducted in an order beginning with a high, sorted compression rate and working toward a low, sorted value compression rate.

* * * * *